Figures 1, 2, 3:
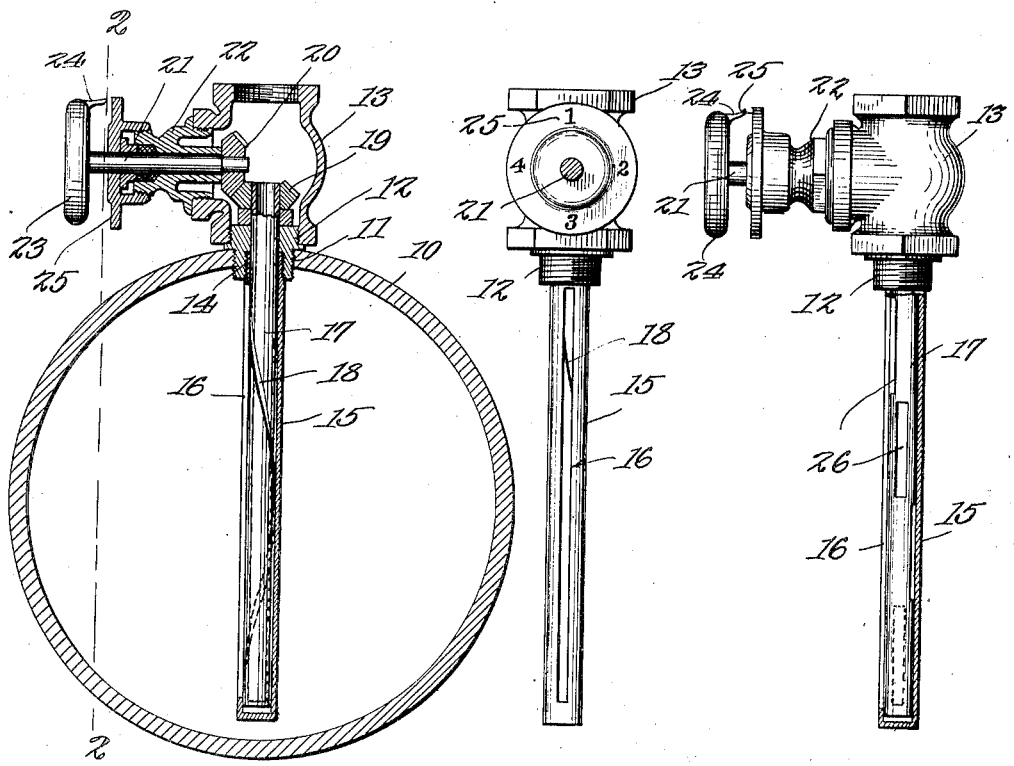

UNITED STATES PATENT OFFICE.

CARL C. THOMAS, OF ROLAND PARK, MARYLAND.

SAMPLING-TUBE FOR CALORIMETERS.

1,108,278.  Specification of Letters Patent.  Patented Aug. 25, 1914.

Application filed June 1, 1914. Serial No. 842,215.

*To all whom it may concern:*

Be it known that I, CARL C. THOMAS, a citizen of the United States, residing at Roland Park, in the county of Baltimore and State of Maryland, have invented certain new and useful Improvements in Sampling-Tubes for Calorimeters, of which the following is a specification.

This invention relates to sampling tubes adapted to be used in connection with steam calorimeters and the like, and has special reference to devices of such character for determining the percentage of moisture of the steam passing through a pipe at different points in the cross section of the said pipe.

The principal object of the invention is to provide an improved device of this character adapted to be used in connection with calorimeters or other suitable measuring instruments, and arranged to establish communication between such instruments and various successive points in the cross section of a steam passage or other conductor of substances, the object being to obtain representative samples of the substance passing through the pipe, and to conduct such samples to the attached instruments.

With the foregoing and other objects in view, the invention consists in general of certain novel features of construction and combinations of parts hereinafter fully described, illustrated in the accompanying drawings, and specifically claimed.

In the accompanying drawings, like characters of reference indicate like parts in the several views, and Figure 1 is a transverse section through a pipe showing the device applied thereto. Fig. 2 is a section on the line 2—2 of Fig. 1 showing the device removed from the pipe. Fig. 3 is a side elevation, partly in section of a modified form of the device.

In the embodiment of the invention shown in Figs. 1 and 2 there is displayed a pipe 10 to which the device is applied. This pipe 10 is provided on its upper side with a threaded opening 11 wherein is secured a nipple 12 carrying a pipe fitting 13. The nipple 12 is provided with a socket 14 opening into the pipe 10 and in this socket 14 is screwed a pipe 15 closed at its lower end and provided with a longitudinally extending slot 16. Revolubly mounted in the pipe 15 is a tube 17 having a spiral slot 18 formed therein so that as the tube 17 is rotated, communication is established between the interior of the pipe 10 and a certain point in the length of the tube 17, the point being determined by the position of said tube. On the upper end of this tube is provided a bevel gear 19 wherewith meshes a bevel gear 20 mounted on a shaft 21 extending through a gland which is indicated generally at 22 and which is of the ordinary variety. On the shaft 21 is a hand wheel 23 carrying an index finger or marker 24 arranged to travel over a dial 25 provided on the gland 21 so that the position of the tube 17 and its slot 18 may be thereby indicated.

In Fig. 3 the slot 18 is modified by being formed longitudinally of the tube 17 in circumferentially displaced portions as indicated at 26, but the result is the same in both cases since the rotation of the tube 17 within the tube 16 produces a lower or higher communication between the pipe 10 and the interior of said pipe 17.

In use, the degree of moisture in the steam or other substance passing any point along the slot 16 may be determined by establishing communication between the interior of the pipe 10 and the measuring instruments without the pipe by rotating the tube 17 to a desired point of communication, and then taking observations on the said measuring instruments, such as steam calorimeters and the like.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is desired to include all such as come properly within the scope claimed.

Having thus described the invention, what is claimed as new, is:

1. In a device of the character described, a tube adapted for insertion in a steam pipe, said tube being provided with a longitudinal slot extending along one side thereof, a second tube revolubly fitted within the first tube, said second tube having spirally disposed port communication with said slot, and means to rotate the second tube within the first tube.

2. In a device of the character described, a tube adapted for insertion in a steam pipe, said tube being provided with a longitudinal slot extending along one side thereof, said second tube being provided with a spirally disposed slot forming port communication between the first mentioned slot and the interior of the second tube.

3. In a device of the character described, a T fitting open at its upper end, a nipple secured in the lower end of said T fitting, a tube having its upper end secured in said nipple and provided with a longitudinal slot, a second tube fitting within the first tube and provided with a spirally disposed slot, a bevel gear mounted on the second tube within said fitting, a shaft adapted for hand manipulation extending laterally into said fitting, and a bevel gear mounted in said shaft and engaging the first mentioned bevel gear.

In testimony whereof I affix my signature in presence of two witnesses.

CARL C. THOMAS.

Witnesses:
 E. WALTON BREWINGTON,
 HOWARD D. ADAMS.